United States Patent [19]

Morimitsu et al.

[11] Patent Number: 4,841,032
[45] Date of Patent: Jun. 20, 1989

[54] FIBER REACTIVE MONOAZO COMPOUNDS HAVING TWO VINYLSULFONE TYPE FIBER REACTIVE GROUPS IN THE MOLECULE

[75] Inventors: Toshihiko Morimitsu; Sadanobu Kikkawa, both of Minoo; Naoki Harada, Suita; Takashi Omura, Ashiya, all of Japan

[73] Assignee: Sumitomo Chemical Company, Limited, Osaka, Japan

[21] Appl. No.: 90,508

[22] Filed: Aug. 28, 1987

[30] Foreign Application Priority Data

Sep. 19, 1986 [JP] Japan .................. 61-223453
Nov. 18, 1986 [JP] Japan .................. 61-274868

[51] Int. Cl.$^4$ .............. C09B 62/51; D06P 1/384; D06P 3/66
[52] U.S. Cl. .................... 534/642; 534/598; 534/887
[58] Field of Search ............ 534/642, 617, 803

[56] References Cited

U.S. PATENT DOCUMENTS

| | | | |
|---|---|---|---|
| 3,223,470 | 12/1965 | Boedeker et al. | 534/638 |
| 4,341,699 | 7/1982 | Tezuka et al. | 534/638 |
| 4,626,589 | 12/1986 | Omura et al. | 534/642 X |
| 4,645,832 | 2/1987 | Niwa et al. | 534/642 X |
| 4,698,421 | 10/1987 | Kayame et al. | 534/642 |

FOREIGN PATENT DOCUMENTS

| | | | |
|---|---|---|---|
| 0076782 | 4/1983 | European Pat. Off. | 534/642 |
| 0218131 | 4/1987 | European Pat. Off. | 534/642 |
| 1350612 | 12/1963 | France | 534/641 |
| 46-824 | 1/1971 | Japan | 534/642 |

OTHER PUBLICATIONS

Kagaku to Kougyou (Science and Industry), vol. 42, No. 11, pp. 583-594 (1968).

*Primary Examiner*—Floyd D. Higel
*Attorney, Agent, or Firm*—Stevens, Davis, Miller & Mosher

[57] ABSTRACT

A monoazo compound of the following formula in a free acid form,

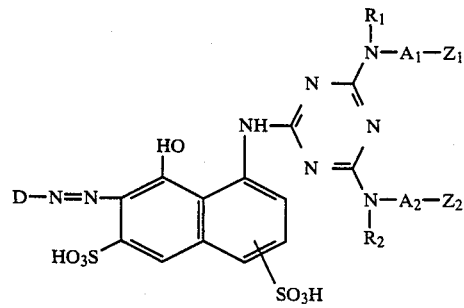

wherein $A_1$ and $A_2$ are phenylene or naphthylene, $Z_1$ and $Z_2$ are $-SO_2CH=CH_2$ or $-SO_2CH_2CH_2Y$ in which Y is a splittable group, $R_1$ and $R_2$ are hydrogen or alkyl, and D is sulfophenyl or sulfonaphthyl, provided that $-A_1-Z_1$ and $-A_2-Z_2$ are different from each other when D is sulfophenyl and both $R_1$ and $R_2$ are hydrogen, which is useful for dyeing or printing fiber materials to give dyed products of high fastness properties with extremely high color depth.

8 Claims, No Drawings

FIBER REACTIVE MONOAZO COMPOUNDS HAVING TWO VINYLSULFONE TYPE FIBER REACTIVE GROUPS IN THE MOLECULE

The present invention relates to a monoazo compound, a process for producing the same and a process for dyeing or printing fiber materials using the same. More specifically, the present invention relates to a monoazo compound having two vinylsulfone type fiber reactive groups in the molecule, which is particularly useful for dyeing or printing fiber materials in a red color.

Many kinds of reactive dyes useful for dyeing or printing fiber materials in a red color are known. For example, U.S. Pat. No. 3,223,470 discloses a red reactive dye represented by the following formula in a free acid form,

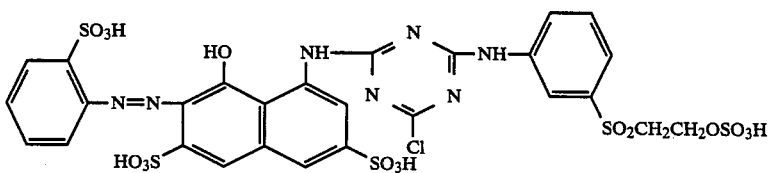

and U.S. Pat. No. 4,341,699 also discloses a reactive red dye represented by the following formula in a free acid form,

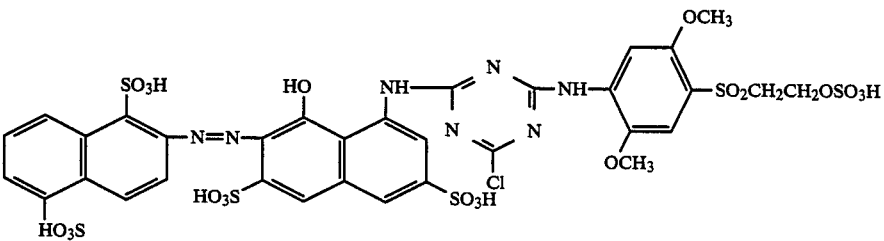

Moreover, in a literature "KAGAKU TO KOUGYOU" (Science and Industry), vol, 42, No. 11, a red reactive dye represented by the following formula in a free acid form,

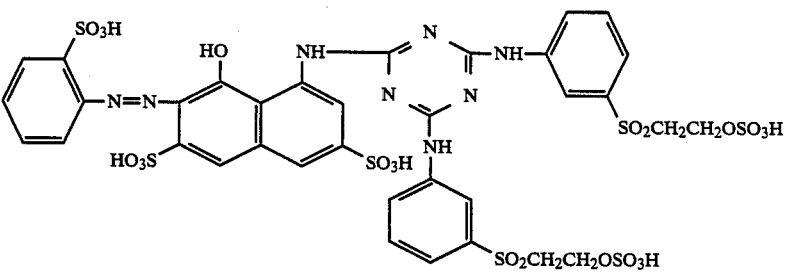

is disclosed.

However, these known dyes are not yet sufficient to meet needs of high level for dye performances such as solubility, build-up property, washing-off property and insusceptibility to dyeing temperatures, and fastness properties of dyed products such as acid-hydrolysis fastness, perspiration-light fastness and chlorine fastness.

It is natural that the solubility is a significant property required for the reactive dye on carrying out the dyeing or printing of fiber materials without any difficulty, as already known, for example, in a dictionary of dyes and dyeing, edited by K. G. Ponting, page 159 (1980). Moreover, dyeing and printing systems in a dye house have been actively mechanized and automated in many aspects for saving energy and labor, and therefore the reactive dyes have been eagerly required to be formed into an aqueous liquid composition for automatic weighing and dispensing systems. Also for this reason, the solubility of the reactive dye is significant.

Generally speaking, a reactive dye having a high solubility should decrease its affinity to fibers, and it is easy to hydrolyze its fiber reactive group, resulting in decrease of its build-up property. Therefore, it is considered that the solubility of the reactive dye can be improved with detriment to the build-up property and vice versa.

Nevertheless, the reactive dyes have been required to be improved in the solubility and build-up property at the same time and in a high degree.

The present inventors have undertaken extensive studies to improve the defects of the above known reactive dyes and to find reactive dyes of a red color meeting various needs of high level dying including those described above, and as a result found a specific monoazo compound.

The present invention provides a monoazo compound represented by the following formula (I) in a free acid form,

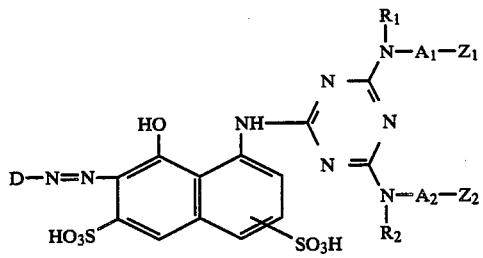

wherein $A_1$ and $A_2$ independently of one another are unsubstituted or substituted phenylene or naphthlene, $Z_1$ and $Z_2$ independently of one another are $-SO_2CH=CH_2$ or $-SO_2CH_2CH_2Y$ in which Y is a group splittable by the action of an alkali, $R_1$ and $R_2$ independently of one another are hydrogen or unsubstituted or substituted alkyl, and D is a sulfophenyl of the formula,

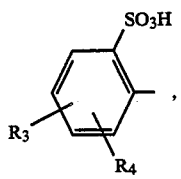

in which $R_3$ and $R_4$ independently of one another are hydrogen, methyl, ethyl, methoxy, ethoxy, chloro, bromo, acetylamino, propionylamino, nitro, sulfo or carboxy, or a sulfonaphthyl of the formula,

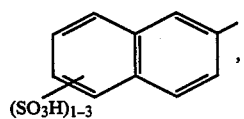

provided that $-A_1-Z_1$ and $-A_2-Z_2$ are different from each other when D is the sulfophenyl and both $R_1$ and $R_2$ are hydrogen, and a process for producing the monoazo compound of the formula (I), which comprises subjecting a monoazo intermediate compound of the following formula (II) in a free acid form,

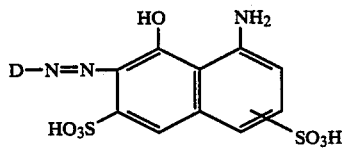

wherein D is as defined above, an amine compound of the following formula (III),

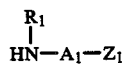

wherein $A_1$, $Z_1$ and $R_1$ are as defined above, and another amine compound of the following formula (IV),

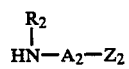

wherein $A_2$, $Z_2$ and $R_2$ are as defined above, to condensation in an optional order with a cyanuric halide.

The present invention also provides a process for dyeing or printing fiber materials, which comprises using the monoazo compound of the formula (I).

In the formula (I), the unsubstituted or substituted phenylene represented by $A_1$ and $A_2$ is preferably the one represented by the following formula,

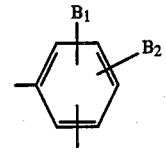

wherein $B_1$ and $B_2$ independently of one another are hydrogen, methyl, ethyl, methoxy, ethoxy, halogeno (e.g. chloro, bromo) or sulfo, and the unsubstituted or substituted naphthylene is preferably the one unsubstituted or substituted with one sulfo. Examples thereof are as follows.

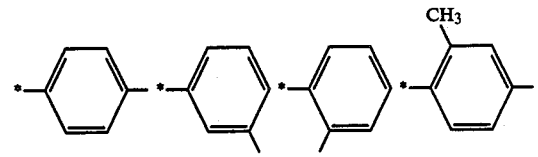

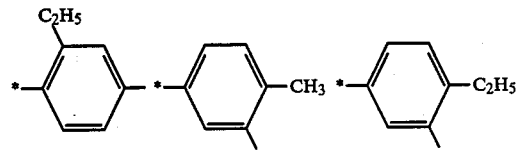

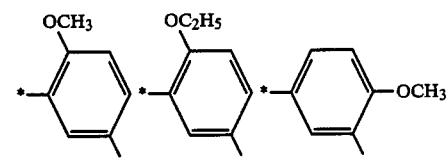

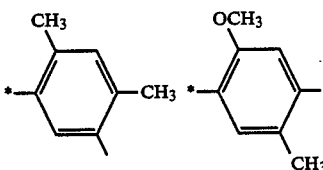

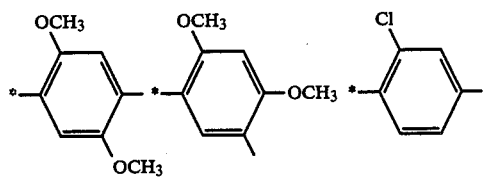

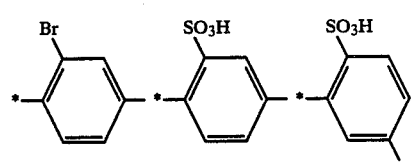

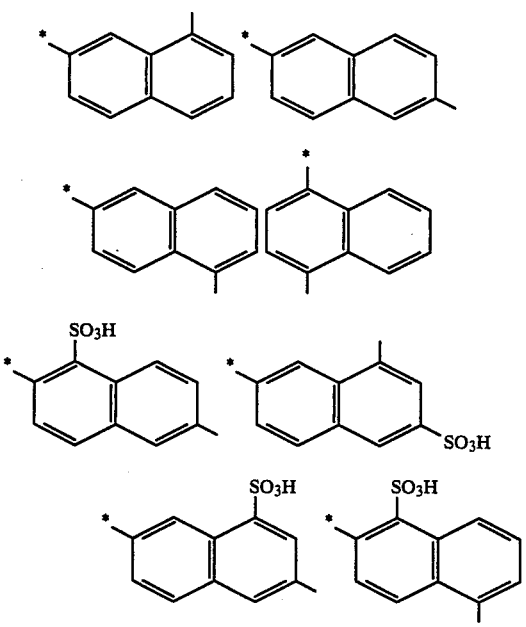

In the above, the asterisked linkage is bonded to the group of —NR$_1$— or —NR$_2$—.

The symbol Y in —SO$_2$CH$_2$CH$_2$Y which is represented by Z$_1$ and Z$_2$ denotes a group capable of being split by the action of an alkali and includes different groups known per se such as sulfuric acid ester group, thiosulfuric acid ester group, phosphoric acid ester group, acetic acid ester group and halogen atoms (e.g. chlorine). Of those groups represented by Z$_1$ and Z$_2$, particularly preferred is a β-sulfatoethylsulfonyl group (—SO$_2$CH$_2$CH$_2$OSO$_3$H), which may be incorporated with a vinylsulfonyl group (—SO$_2$CH=CH$_2$). In the present invention, the most preferred is a case where both Z$_1$ and Z$_2$ denote the β-sulfatoethylsulfonyl group.

The alkyl group represented by R$_1$ and R$_2$ is preferably one having 1 to 4 carbon atoms, which is unsubstituted or substituted with hydroxy, cyano, alkoxy, halogeno, carboxy, carbamoyl, alkoxycarbonyl, alkylcarbonyloxy, sulfo, sulfamoyl and the like. Preferred examples of the unsubstituted or substituted alkyl group are methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulobutyl, sulfamoylmethyl, 2-sulfamoylethyl, 3-sulfamoylpropyl, 4-sulfamoylbutyl, and the like. In the present invention, particularly preferred R$_1$ and R$_2$ are independently hydrogen, methyl and ethyl.

Among the monoazo compounds represented by the formula (I), particularly preferred are those represented by the following formulas (I-1), (I-2) and (I-3), each in free acid form,

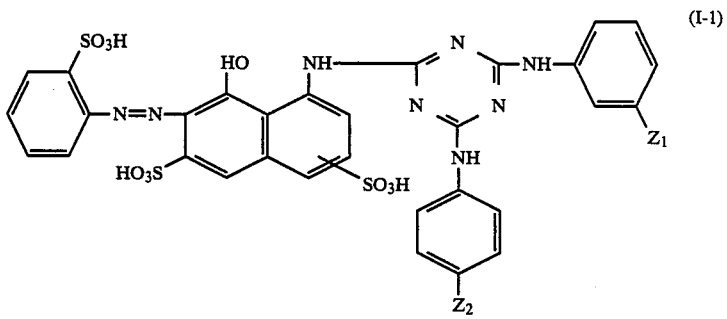

wherein Z$_1$ and Z$_2$ are as defined above,

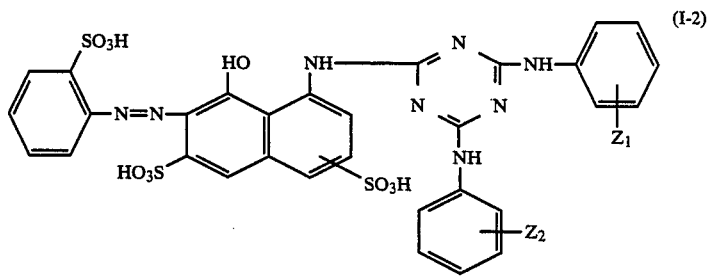

wherein Z$_1$ and Z$_2$ are as defined above, and R$_5$ is an alkyl group having 1 to 4 carbon atoms (examples thereof are the same as those illustrated for R$_1$ and R$_2$, and preferred are methyl, ethyl, hydroxyethyl, cyanoethyl, carboxyethyl and the like), and

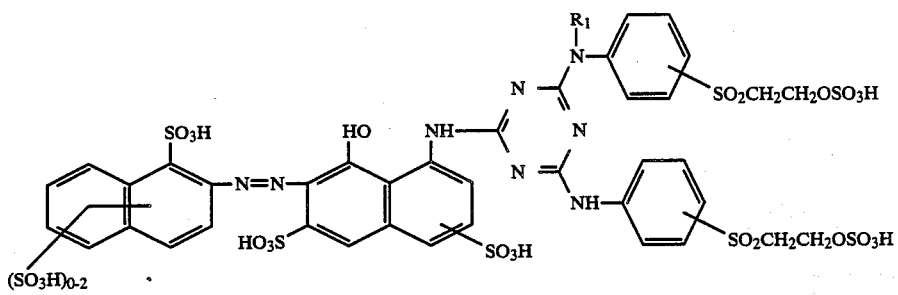

wherein $R_1$ is as defined above.

The monoazo compound (I) of the present invention can be produced in a manner known per se, for example, by subjecting the monoazo intermediate compound of the formula (II), the amine compound of the formula (III) and another amine compound of the formula (IV) to condensation in an optional order with a cyanuric halide such as cyanuric chloride and cyanuric fluoride. In this manner, the order of condensation is not particularly limited. Considering, however, the yield and quality of the monoazo compound (I) obtained, it is preferred to use any one of (II), (III) and (IV) having the lowest reactivity to the cyanuric halide first of all for the condensation with the cyanuric halide.

A first condensation of any one of (II), (III) and (IV) with the cyanuric halide can be carried out in an aqueous medium at a temperature of −10° to 50° C., preferably 0° to 30° C., while controlling the pH within 1 to 10, preferably 2 to 7. A second condensation of any one of the remaining two with the first condensate can be carried out in an aqueous medium at a temperature of 10° to 80° C., preferably 20° to 50° C., while controlling the pH within 2 to 9, preferably 3 to 6, and a third condensation of the last one with the second condensate in an aqueous medium at a temperature of 40° to 100° C., preferably 40° to 80° C., while controlling the pH within 2 to 9, preferably 3 to 6.

The monoazo intermediate compound (II) can be prepared by diazotizing an aromatic amine represented by the following formula (V),

D—NH$_2$      (V)

wherein D is as defined above, followed by coupling with a naphthalenedisulfonic acid represented by the following formula (VI) in a free acid form,

the diazotizing and coupling being carried out in a conventional manner known per se.

The aromatic amine (V) usable in the present invention includes an aniline compound and a naphthylamine compound, each being represented by the following formulas (VII) and (VIII), each in free acid form respectively.

(VII)

(VIII)

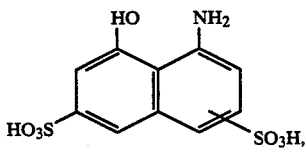

wherein $R_3$ and $R_4$ are as defined above.

Examples of the aniline compound (VII) are:
2-Aminobenzenesulfonic acid
2-Amino-5-methylbenzenesulfonic acid
2-Amino-5-ethylbenzenesulfonic acid
2-Amino-5-methoxybenzenesulfonic acid
2-Amino-5-ethoxybenzenesulfonic acid
2-Amino-5-chlorobenzenesulfonic acid
2-Amino-5-bromobenzenesulfonic acid
2-Amino-5-acetylaminobenzenesulfonic acid
2-Amino-5-propionylaminobenzenesulfonic acid
2-Amino-5-nitrobenzenesulfonic acid
2-Amino-4-chloro-5-methylbenzenesulfonic acid
2-Amino-5-chloro-4-methylbenzenesulfonic acid
2-Amino-4-methoxybenzenesulfonic acid
2-Amino-4-ethoxybenzenesulfonic acid
2-Aminobenzene-1,4-disulfonic acid
2-Aminobenzene-1,5-disulfonic acid
2-Amino-5-methylbenzene-1,4-disulfonic acid
2-Amino-5-ethylbenzene-1,4-disulfonic acid
2-Amino-5-methoxybenzene-1,4-disulfonic acid
2-Amino-5-ethoxybenzene-1,4-disulfonic acid
2-Amino-5-acetylaminobenzene-1,4-disulfonic acid
2-Amino-5-propionylaminobenzene-1,4-disulfonic acid Of these, particularly preferred are 2-aminobenzenesulfonic acid, 2-amino-5-methylbenzenesulfonic acid, 2-amino-5-ethylbenzenesulfonic acid, 2-amino-5-methoxybenzenesulfonic acid, 2-amino-5-ethoxybenzenesulfonic acid, 2-amino-5-chlorobenzenesulfonic acid, 2-aminobenzene-1,5-disulfonic acid, 2-aminobenzene-1,4-disulfonic acid and the like.

Examples of the naphthylamine compound (VIII) are:
2-Aminonaphthalene-1-sulfonic acid
6-Aminonaphthalene-1-sulfonic acid
7-Aminonaphthalene-1-sulfonic acid
6-Aminonaphthalene-2-sulfonic acid
7-Aminonaphthalene-2-sulfonic acid
6-Aminonaphthalene-1,3-disulfonic acid 7-Aminonaphthalene-1,3-disulfonic acid
2-Aminonaphthalene-1,5-disulfonic acid
3-Aminonaphthalene-1,5-disulfonic acid
3-Aminonaphthalene-2,6-disulfonic acid
3-Aminonaphthalene-2,7-disulfonic acid
6-Aminonaphthalene-1,3,5-trisulfonic acid
7-Aminonaphthalene-1,3,5-trisulfonic acid
7-Aminonaphthalene-1,3,6-trisulfonic acid.

Of these, particularly preferred are 2-aminonaphthalene-1-sulfonic acid, 2-aminonaphthalene-1,5-disulfonic acid, 2-aminonaphthalene-1,7-disulfonic acid, 6-aminonaphthalene-1,3,5-trisulfonic acid and the like.

The naphthalenedisulfonic acid (VI) includes 1-amino-8-hydroxynaphthalene-3,6-disulfonic acid, 1-amino-8-hydroxynaphthalene-4,6-disulfonic acid and the like.

All the starting compounds described above may be used in the form of a free acid or a salt such as alkali metal and alkaline earth metal salts.

The monoazo compound of the formula (I) may be in the form of a free acid, preferably in the form of an alkali metal or alkaline earth metal salt such as sodium salt, potassium salt, lithium salt and the like.

After completion of the reaction, the desired monoazo compound (I) containing reaction mixture may be subjected to salting-out in a conventional manner using an electrolyte, demineralization using a semipermeable membrane, evaporation such as spray-drying and the like to provide the monoazo compound (I) in the form of a powdery or liquid commercial product.

The monoazo compound (I) of the present invention is fiber-reactive and useful for dyeing or printing hydroxyl group-containing and amide group-containing materials in a fibrous form including unmixed or mixed fiber spinning.

The hydroxyl group-containing materials include natural or synthetic hydroxyl group-containing materials such as cellulose fiber materials, cellulose-containing fiber materials, regenerated products thereof and polyvinyl alcohol. Examples of the cellulose fiber materials are cotton and other vegetable fibers such as linen, hemp, jute and ramie fibers. Examples of the regenerated cellulose fibers are viscose staple and filament viscose. Examples of the cellulose-containing fiber materials are mixed fiber materials such as cellulose/polyester, cellulose/wool, cellulose/acryl and the like.

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

For example, cellulose fiber materials can be dyed using the present compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, together with a hydrotropic agent, a penetrant or a level dyeing agent. The neutral salt usable for promoting the exhaustion may be added to a dye bath before or after the temperature reaches a desired level for the dyeing, if desired, dividedly.

The padding can be carried out by padding the fiber materials at ambient temperature or an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 100° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a paste or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkalis under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of neutral or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzene-sulfonic acid or aminonaphthalenesulfonic acid, or an addition product between stearylamine and ethylene oxide, and the like.

The present monoazo compound (I) can be characterized by excellent dye performances in the dyeing and printing of fiber materials, particularly cellulose fiber materials. For example, the compound can give a dyed product excellent in light fastness, perspiration-light fastness, formalin fastness, wet fastness such as washing resistance, peroxide-washing resistance, chlorine resistance, chlorine bleaching resistance, perspiration resistance and acid-hydrolysis resistance, and alkali fastness, abrasion fastness and iron fastness. The monoazo compound (I) can also exhibit extremely excellent build-up, level-dyeing and washing-off properties and high solubility as well as high exhaustion and fixation percentages. Moreover, when used for the dyeing or printing, the monoazo compound (I) can hardly be affected by changes in a dyeing temperature, an alkali agent, an amount of inorganic salts and bath ratio, so that a dyed or printed product with a constant quality can be obtained with superior reproducibility.

Further, particularly when applied for the dyeing by the cold batch-up dyeing method, the monoazo compound (I) can exhibit excellent build-up property and alkali stability (almost no hydrolysis by the action of the alkali agent), and almost no difference in the depth and shade appears between the dyed products obtained by fixing at 25° C. and at a lower temperature than that.

The present invention is illustrated in more detail with reference to the following Examples, which are only illustrative, but not limitative. In Examples, all parts and % are by weight.

EXAMPLE 1

A monoazo intermediate compound of the following formula (50.4 parts),

To the first condensation reaction mixture was added 1-aminobenzene-4-β-sulfatoethylsulfone (28.1 parts), and the mixture was heated upto 40°·C., while controlling the pH within 4 to 5 using a 20% aqueous sodium carbonate solution, and stirred at that temperature within that pH to perform a second condensation.

Successively, 1-aminobenzene-3-β-sulfatoethylsulfone (28.1 parts) was added to the above second condensation reaction mixture, and the resulting mixture was heated upto 80° C., while controlling the pH within 4 to 5 using a 20% aqueous sodium carbonate solution, and then stirred at that temperature within that pH to perform a third condensation. Sodium chloride (25 parts) was added to the reaction mixture to precipitate crystals, which were separated on a suction filter, washed and then dried at 60° C. to obtain a monoazo compound of the following formula (1), in a free acid form.

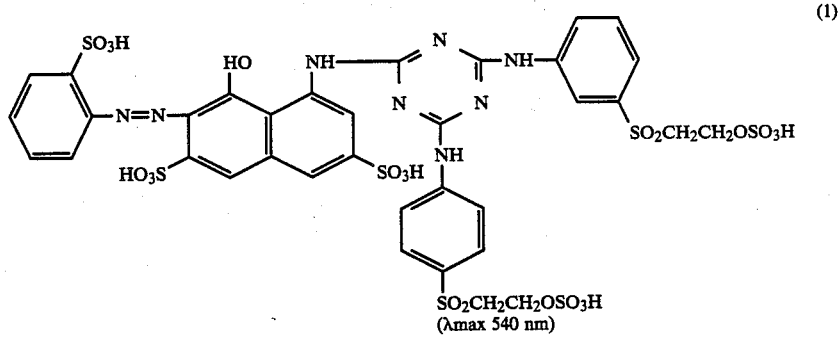

(1)

(λmax 540 nm)

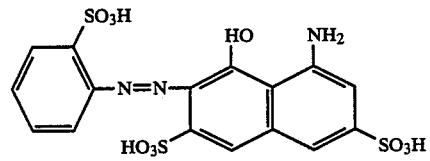

was dissolved in water (1000 parts), and cyanuric chloride (18.5 parts) was added thereto. The mixture was stirred at 0° to 5° C., while controlling the pH within 2.5 to 3.5 using a 20% aqueous sodium carbonate solution, to perform a first condensation.

EXAMPLES 2 to 19

Example 1 was repeated, provided that a monoazo intermediate compound of the formula (II) shown in a second column of the following table, an amine compound of the formula (III) in a third column and another amine compound of the formula (IV) in a fourth column were used in place of the monoazo intermediate compound, 1-aminobenzene-4-β-sulfatoethylsulfone and 1-aminobenzene-3-β-sulfatoethylsulfone used in Example 1, respectively, to obtain the corresponding monoazo compounds 2 to 19.

| Example No. | Compound of the formula (II) | Amine of the formula (III) | Another amine of the formula (IV) | Shade |
|---|---|---|---|---|
| 2 | ![structure with SO3H, HO, NH2, N=N, HO3S, SO3H] | H2N—⌬—SO2CH=CH2 | H2N—⌬—SO2CH2CH2OSO3H | Red |
| 3 | " | H2N—⌬—SO2CH2CH2OSO3H | H2N—⌬—SO2CH=CH2 | " |
| 4 | " | H2N—⌬—SO2CH=CH2 | " | " |

| Example No. | Compound of the formula (II) | Amine of the formula (III) | Another amine of the formula (IV) | Shade |
|---|---|---|---|---|
| 5 | " | 3-H$_2$N-C$_6$H$_4$-SO$_2$CH$_2$CH$_2$OSO$_3$H | 2-OCH$_3$, 4-SO$_2$CH$_2$CH$_2$OSO$_3$H aniline | Bluish red |
| 6 | 2-(2-sulfophenylazo)-1-hydroxy-8-amino-3,6-naphthalenedisulfonic acid | 3-H$_2$N-C$_6$H$_4$-SO$_2$CH$_2$CH$_2$OSO$_3$H | 2-OCH$_3$, 4-SO$_2$CH$_2$CH$_2$OSO$_3$H aniline | Bluish red |
| 7 | " | " | 2-OCH$_3$, 5-CH$_3$, 4-SO$_2$CH$_2$CH$_2$OSO$_3$H aniline | " |
| 8 | " | " | 2-H$_2$N-C$_6$H$_4$-SO$_2$CH$_2$CH$_2$OSO$_3$H | Red |
| 9 | " | " | 4-H$_2$N-C$_6$H$_4$-SO$_2$CH$_2$CH$_2$OCOCH$_3$ | " |
| 10 | 2-(2-sulfophenylazo)-1-hydroxy-8-amino-3,6-naphthalenedisulfonic acid | 3-H$_2$N-C$_6$H$_4$-SO$_2$CH$_2$CH$_2$OSO$_3$H | 2-SO$_3$H, 4-SO$_2$CH$_2$CH$_2$OSO$_3$H aniline | Red |
| 11 | " | " | 4-H$_2$N-C$_6$H$_4$-SO$_2$CH$_2$CH$_2$OSO$_3$H | Yellowish red |
| 12 | " | " | 2-OCH$_3$, 5-CH$_3$, 4-SO$_2$CH$_2$CH$_2$OSO$_3$H aniline | Yellowish red |
| 13 | " | 2-OCH$_3$, 5-SO$_2$CH$_2$CH$_2$OSO$_3$H aniline | " | Yellowish red |
| 14 | 2-(4-methyl-2-sulfophenylazo)-1-hydroxy-8-amino-3,6-naphthalenedisulfonic acid | 3-H$_2$N-C$_6$H$_4$-SO$_2$CH$_2$CH$_2$OSO$_3$H | 2-SO$_3$H, 4-SO$_2$CH$_2$CH$_2$OSO$_3$H aniline | Bluish red |
| 15 | " | " | 4-H$_2$N-C$_6$H$_4$-SO$_2$CH$_2$CH$_2$OSO$_3$H | Bluish red |
| 16 | 2-(4-methoxy-2-sulfophenylazo)-1-hydroxy-8-amino-3,6-naphthalenedisulfonic acid | " | " | Bluish red |

| Example No. | Compound of the formula (II) | Amine of the formula (III) | Another amine of the formula (IV) | Shade |
|---|---|---|---|---|
| 17 | ![structure with SO3H, HO, NH2, N=N, HO3S, SO3H groups on naphthalene] | " | " | Red |
| 18 | ![similar structure] | H2N-C6H4-SO2CH2CH2OSO3H | H2N-C6H3(CH3)2-SO2CH2CH2OSO3H | Red |
| 19 | " | H2N-C6H4-SO2CH=CH2 | H2N-C6H4-SO2CH2CH2OSO3H | " |

EXAMPLE 20

Cyanuric chloride (18.5 parts) was dispersed in water (1000 parts), and 1-N-ethylaminobenzene-3-β-sulfatoethylsulfone (30.9 parts) was added thereto. The mixture was stirred at 0° to 5° C., while controlling the pH within 2 to 3 using a 20% aqueous sodium carbonate solution, to perform a first condensation.

To the first condensation reaction mixture was added 1-aminobenzene-3-β-sulfatoethylsulfone (28.1 parts), and the mixture was heated upto 20° to 30° C., while controlling the pH within 4 to 5, and stirred at that temperature within that pH to perform a second condensation.

Successively, a monoazo intermediate compound of the following formula (50.4 parts),

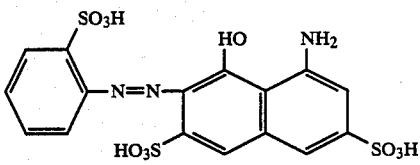

was added to the above second condensation reaction mixture, and the mixture was heated upto 60° to 70° C., while controlling the pH within 4 to 5, and stirred at that temperature within that pH to perform a third condensation.

Sodium chloride was added to the reaction mixture to deposit crystabls, which were separated on a suction filter, washed and dried at 60° C. to obtain a monoazo compound of the following formula (20), in a free acid form.

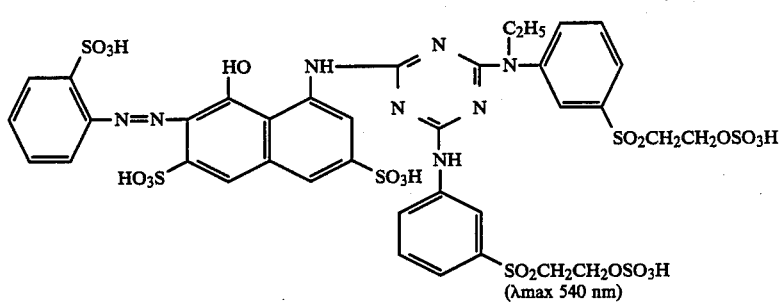

(20)

(λmax 540 nm)

EXAMPLES 21 to 42

Example 20 was repeated, provided that a monoazo intermediate compound of the formula (II) shown in a second column of the following table, an amine compound of the formula (III) in a third column and another amine compound of the formula (IV) in a fourth column were used in place of the monoazo intermediate compound, 1-N-ethylaminobenzene-3-β-sulfatoethylsulfone and 1-aminobenzene-3-β-sulfatoethylsulfone used in Example 20, respectively, to obtain the corresponding monoazo compounds 21 to 42.

| Example No. | Compound of the formula (II) | Amine of the formula (III) | Another amine of the formula (IV) | Shade |
|---|---|---|---|---|
| 21 | ![](II-structure: 8-amino-1-hydroxy-naphthalene-3,6-disulfonic acid coupled with 2-sulfophenyl diazo) | 3-(C2H5)NH-C6H4-SO2CH2CH2OSO3H | 4-H2N-C6H4-SO2CH2CH2OSO3H | Red |
| 22 | " | 4-(C2H5)NH-C6H4-SO2CH2CH2OSO3H | " | " |
| 23 | " | " | 3-H2N-C6H4-SO2CH2CH2OSO3H | " |
| 24 | " | 3-(C2H4CN)NH-C6H4-SO2CH2CH2OSO3H | " | " |
| 25 | " | 4-(C2H4OH)NH-C6H4-SO2CH2CH2OSO3H | 3-H2N-C6H4-SO2CH2CH2OSO3H | Red |
| 26 | " | 3-(CH3)NH-C6H4-SO2CH=CH2 | " | " |

-continued

| Example No. | Compound of the formula (II) | Amine of the formula (III) | Another amine of the formula (IV) | Shade |
|---|---|---|---|---|
| 27 | (structure) | 3-(N-methylamino)phenyl-SO$_2$CH$_2$CH$_2$OSO$_3$H | 2-methoxy-5-amino-phenyl-SO$_2$CH$_2$CH$_2$OSO$_3$H | Yellowish red |
| 28 | " | 3-(N-ethylamino)phenyl-SO$_2$CH$_2$CH$_2$OSO$_3$H | 4-aminophenyl-SO$_2$CH$_2$CH$_2$OSO$_3$H | " |
| 29 | (structure) | 3-(N-ethylamino)phenyl-SO$_2$CH$_2$CH$_2$OSO$_3$H | 4-aminophenyl-SO$_2$CH$_2$CH$_2$OSO$_3$H | Bluish red |
| 30 | (structure) | " | 3-aminophenyl-SO$_2$CH$_2$CH$_2$OSO$_3$H | " |
| 31 | (structure) | " | " | Red |
| 32 | (structure) | 4-(N-(2-carboxyethyl)amino)phenyl-SO$_2$CH$_2$CH$_2$OSO$_3$H | " | Bluish red |

-continued

| Example No. | Compound of the formula (II) | Amine of the formula (III) | Another amine of the formula (IV) | Shade |
|---|---|---|---|---|
| 33 | naphthalene with NH₂, OH, SO₃Na, and azo linkage to phenyl-SO₃Na (o-SO₃Na), NaO₃S substituents | 3-(C₂H₅)HN-C₆H₄-SO₂CH₂CH₂OSO₃Na | 3-(C₂H₅)HN-C₆H₄-SO₂CH₂CH₂OSO₃Na | " |
| 34 | " | 4-(CH₃)HN-C₆H₄-SO₂CH₂CH₂OSO₃Na | 4-(CH₃)HN-C₆H₄-SO₂CH₂CH₂OSO₃Na | Red |
| 35 | " | " | 4-(C₂H₄COOH)HN-C₆H₄-SO₂CH₂CH₂OSO₃Na (3-substituted) | " |
| 36 | " | 4-(C₂H₅)HN-C₆H₄-SO₂CH₂CH₂OSO₃Na | 4-CH₃, 2-SO₂CH₂CH₂OSO₃Na aniline (HN-CH₃) | " |
| 37 | same as 33 | 4-(C₂H₅)HN-C₆H₄-SO₂CH₂CH₂OSO₃Na | " | Red |
| 38 | " | 2-amino-8-SO₃Na-6-(SO₂CH₂CH₂OSO₃Na)-naphthalene (H₂N, SO₃Na) | 2-amino-8-SO₃Na-6-(SO₂CH₂CH₂OSO₃Na)-naphthalene | " |
| 39 | " | " | " | " |

-continued

| Example No. | Compound of the formula (II) | Amine of the formula (III) | Another amine of the formula (IV) | Shade |
|---|---|---|---|---|
| 40 | " | " | 8-amino-2-(2-sulfatoethylsulfonyl)-6-sulfonaphthalene (H$_2$N–naphthalene with SO$_2$CH$_2$CH$_2$OSO$_3$Na and SO$_3$Na) | " |
| 41 | 1-hydroxy-8-amino-2-[(2-sulfophenyl)azo]-3,6-disulfonaphthalene | 3-aminophenyl-2-sulfatoethylsulfone (H$_2$N–C$_6$H$_4$–SO$_2$CH$_2$CH$_2$OSO$_3$Na) | 8-amino-2-(2-sulfatoethylsulfonyl)-6-sulfonaphthalene | Red |
| 42 | " | " | 8-amino-2-(2-sulfatoethylsulfonyl)naphthalene | " |

EXAMPLE 43

A monoazo intermediate compound of the following formula (63.4 parts),

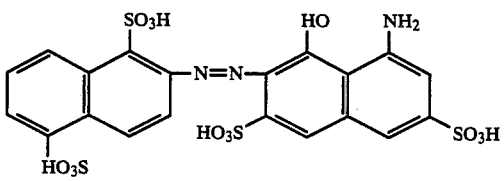

was dissolved in water (500 parts), and cyanuric chloride (18.5 parts) was added thereto. The mixture was stirred at 0° to 5° C., while controlling the pH within 2.5 to 3.5 using a 20% aqueous sodium carbonate solution, performing a first condensation.

To the first condensation reaction mixture was added 1-aminobenzene-4-$\beta$-sulfatoethylsulfone (28.1 parts), and the mixture was stirred at 40° C., while controlling the pH within 4 to 6, to perform a second condensation.

Successively, 1-aminobenzene-3-$\beta$-sulfatoethylsulfone (28.1 parts) was added to the second condensation reaction mixture, and the mixture was heated upto 80° C., while controlling the pH within 4 to 5, and then stirred at that temperature within that pH to perform a third condensation. Salting out, filtration, washing and drying gave a monoazo compound of the following formula (43) in a free acid form.

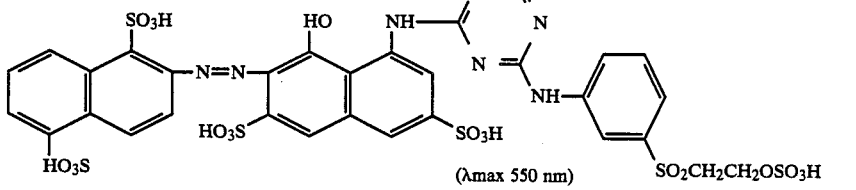

($\lambda$max 550 nm)

(43)

EXAMPLES 44 to 67

Using a monoazo intermediate compound of the formula (II) shown in a second column of the following table, an amine compound (III) in a third column and another amine compound (IV) in a fourth column, example 43 was repeated to obtain the corresponding monoazo compounds which were characterized by a color of dyed products as shown in a fifth column.

| Example No. | Compound of the formula (II) | Amine of the formula (III) | Another amine of the formula (IV) | Shade |
|---|---|---|---|---|
| 44 | 8-amino-1-hydroxy-2-(1,5-disulfo-2-naphthylazo)-naphthalene-3,6-disulfonic acid | 3-aminophenyl vinyl sulfone (H₂N–C₆H₄–SO₂CH=CH₂, meta) | 3-(β-sulfatoethylsulfonyl)aniline (H₂N–C₆H₄–SO₂CH₂CH₂OSO₃H, meta) | Somewhat bluish red |
| 45 | " | 3-(β-sulfatoethylsulfonyl)aniline (H₂N–C₆H₄–SO₂CH₂CH₂OSO₃H, meta) | " | " |
| 46 | " | 4-(N-ethylamino)phenyl β-sulfatoethyl sulfone (C₂H₅–NH–C₆H₄–SO₂CH₂CH₂OSO₃H, para) | " | " |
| 47 | " | 2-amino-4-(β-acetoxyethylsulfonyl)anisole (H₂N, OCH₃, –SO₂CH₂CH₂OCOCH₃) | " | " |
| 48 | 8-amino-1-hydroxy-2-(1,5-disulfo-2-naphthylazo)-naphthalene-3,6-disulfonic acid | 2-amino-6-(β-sulfatoethylsulfonyl)-8-sulfo-naphthalene (H₂N, SO₃H, –SO₂CH₂CH₂OSO₃H) | 3-(β-sulfatoethylsulfonyl)aniline (H₂N–C₆H₄–SO₂CH₂CH₂OSO₃H, meta) | Somewhat bluish red |
| 49 | " | 3-(N-ethylamino)phenyl β-sulfatoethyl sulfone (C₂H₅–NH–C₆H₄–SO₂CH₂CH₂OSO₃H, meta) | 3-(β-sulfatoethylsulfonyl)aniline (H₂N–C₆H₄–SO₂CH₂CH₂OSO₃H, meta) | " |

| Example No. | Compound of the formula (II) | Amine of the formula (III) | Another amine of the formula (IV) | Shade |
|---|---|---|---|---|
| 50 | " | H₂N—C₆H₄—SO₂CH₂CH₂OSO₃H (para) | H₂N—C₆H₄—SO₂CH₂CH₂OSO₃H (para) | " |
| 51 | " | 3-(CH₃)HN—C₆H₄—SO₂CH₂CH₂OSO₃H | " | " |
| 52 | naphthalene structure with NH₂, OH, SO₃H, N=N, linked naphthalene with SO₃H groups | 3-(C₂H₅)HN—C₆H₄—SO₂CH₂CH₂OSO₃H | H₂N—C₆H₄—SO₂CH₂CH₂OSO₃H (para) | Somewhat bluish red |
| 53 | naphthalene structure with NH₂, OH, SO₃H groups, N=N linked | " | " | " |
| 54 | naphthalene structure with NH₂, OH, SO₃H groups, N=N linked | H₂N—C₆H₄—SO₂CH₂CH₂OSO₃H (meta) | H₂N—C₆H₄—SO₂CH₂CH₂OSO₃H (meta) | " |
| 55 | " | 3-(CH₂CH₂COOH)HN—C₆H₄—SO₂CH₂CH₂OPO₃H₂ | " | " |

| Example No. | Compound of the formula (II) | Amine of the formula (III) | Another amine of the formula (IV) | Shade |
|---|---|---|---|---|
| 56 | naphthalene structure with NH₂, HO, SO₃H, HO₃S, SO₃H groups and N=N azo linkage to naphthalene with SO₃H | H₂N–C₆H₄–SO₂CH₂CH₂OSO₃H (para) | H₂N–C₆H₄–SO₂CH₂CH₂OSO₃H (meta) | Somewhat bluish red |
| 57 | naphthalene structure with NH₂, HO, SO₃H groups and N=N azo linkage to naphthalene with SO₃H, HO₃S | " | " | Bluish red |
| 58 | same as 57 | H₂N–naphthyl–SO₂CH₂CH₂OSO₃H | H₂N–C₆H₃(SO₃H)–SO₂CH₂CH₂OSO₃H | " |
| 59 | naphthalene structure with NH₂, HO, SO₃H, HO₃S groups, N=N azo linkage to naphthalene with SO₃H, SO₃H | H₂N–C₆H₄–SO₂CH₂CH₂OSO₃H (meta) | H₂N–C₆H₄–SO₂CH₂CH₂OSO₃H (para) | Red |
| 60 | similar naphthalene bis-structure | H₂N–C₆H₂(OCH₃)(CH₃)–SO₂CH₂CH₂OSO₃H | H₂N–C₆H₄–SO₂CH₂CH₂OSO₃H (para) | Red |

-continued

| Example No. | Compound of the formula (II) | Amine of the formula (III) | Another amine of the formula (IV) | Shade |
|---|---|---|---|---|
| 61 | naphthalene-azo-naphthalene with SO₃H, HO, NH₂, SO₃H, HO₃S substituents | 6-amino-naphthalene-2-SO₂CH₂CH₂OSO₃H, 3-SO₃H | 3-aminophenyl-SO₂CH₂CH₂OSO₃H | Bluish red |
| 62 | " | 4-aminophenyl-SO₂CH₂CH₂OSO₃H | | " |
| 63 | " | 3-aminophenyl-SO₂CH₂CH₂OSO₃H | | " |
| 64 | dinaphthalene-azo with NH₂, HO, SO₃H, HO₃S, HO₃S substituents | 4-amino-3-ethylphenyl-SO₂CH₂CH₂OSO₃H | 4-(N-methyl-N-cyanoethyl)amino-2-ethylphenyl-SO₂CH₂CH₂OSO₃H | Bluish red |
| 65 | " | 4-amino-3-methylphenyl-SO₂CH₂CH₂OSO₃H | 4-amino-2,5-dimethylphenyl-SO₂CH=CH₂ | " |
| 66 | " | 3-amino-4-ethoxyphenyl-SO₂CH₂CH₂OSO₃H | 4-amino-2,5-dimethoxyphenyl-SO₂CH₂CH₂OSO₃H | " |

-continued
| Example No. | Compound of the formula (II) | Amine of the formula (III) | Another amine of the formula (IV) | Shade |
|---|---|---|---|---|
| 67 | " |  |  | " |

DYEING EXAMPLE 1

The monoazo compound (1) obtained in Example 1 (0.3 part) was dissolved in water (200 parts), and sodium sulfate (20 parts) and cotton (10 parts) were added thereto. The bath was heated to 50° C., and 30 minutes thereafter sodium carbonate (4 parts) was added thereto. Dyeing was continued for 1 hour at that temperature. Thereafter, the cotton was washed with water and soaped to obtain a dyed product of a deep red color. The dyed product was excellent in fastness properties, particularly acid-hydrolysis fastness, chlorine fastness, light fastness and perspiration-light fastness, and the monoazo compound was found to have excellent build-up property.

DYEING EXAMPLE 2

The monoazo compound obtained in Example 20 (0.3 part) was dissolved in water (150 parts), and sodium sulfate (30 parts) and cotton (10 parts) were added thereto. The bath was heated to 60° C. 20 Minutes thereafter, sodium carbonate (4 parts) was added thereto. Dyeing was continued for 1 hour at that temperature. The cotton was washed with water and soaped to obtain a dyed product of a deep red color excellent in fastness properties, particularly acid-hydrolysis fastness, chlorine fastness, light fastness and perspiration-light fastness, with excellent build-up property.

DYEING EXAMPLE 3

The monoazo compounds obtained in Examples 1 to 19 each (0.3 parts) was dissolved in water (300 parts), and sodium sulfate (30 parts) and cotton (10 parts) were added thereto. The bath was heated to 60° C. 20 Minutes thereafter, sodium carbonate (5 parts) was added thereto, and dyeing was continued for 1 hour at that temperature. The cotton was washed with water and soaped to obtain each dyed product of a deep red color excellent in fastness properties, perticularly acid-hydrolysis fastness, chlorine fastness, light fastness and perspiration-light fastness with excellent build-up property.

DYEING EXAMPLE 4

The monoazo compounds obtained in Examples 20 to 32 each (0.3 part) was dissolved in water (200 parts), and sodium sulfate (30 parts) and cotton (10 parts) were added thereto. The bath was heated to 50° C. 30 Minutes thereafter, trisodium phosphate (4 parts) was added thereto, and dyeing was continued for 1 hour at that temperature. Thereafter, the cotton was washed with water and soaped to obtain each dyed product of a deep red color excellent in fastness properties, particularly acid-hydrolysis fastness, chlorine fastness, light fastness and perspiration-light fastness with excellent build-up property.

DYEING EXAMPLE 5

Composition of Color Paste

| Monoazo compounds obtained in Examples 1 to 19 and 33 to 57 | Parts each 5 |
|---|---|
| Urea | 5 |
| Sodium alginate (5%), thickener | 50 |
| Hot water | 25 |
| Sodium hydrogencarbonate | 2 |
| Balance (water) | 13 |

Mercerized cotton broad cloth was printed with the color paste having the composition described above, and then pre-dried, subjected to steaming at 100° C. for 5 minutes, rinsed with hot water, soaped, again rinsed with hot water, and then dried. Thus, there was obtained each printed product of a deep red color excellent in fastness properties, particularly acid-hydrolysis fastness, chlorine fastness, light fastness and perspiration-light fastness with a high fixing percent and excellent build-up property.

DYEING EXAMPLE 6

Composition of Color Paste

| Monoazo compounds obtained in Examples 20 to 32 | Parts each 4 |
|---|---|
| Urea | 5 |
| Sodium alginate (5%), thickener | 50 |
| Hot water | 25 |
| Sodium hydrogencarbonate | 2 |
| Balance (water) | 14 |

Using the color paste of the above composition, a manner similar to that of Dyeing Example 5 was repeated, provided that steaming was carried out at 120° C., thereby obtaining a dyed product like in Dyeing Example 5.

DYEING EXAMPLE 7

The monoazo compounds obtained in Examples 1 to 19 and 32 to 67 each (25 parts) was dissolved in hot water, and the solution was cooled to 25° C. 32.5% Aqueous sodium hydroxide solution (5.5 parts) and 50° Be' water glass (150 parts) were added thereto, and water was added to make the whole 1000 parts at 25° C. to obtain a padding liquor. Immediately thereafter, cotton cloth was padded with the padding liquor and batched up, and the cloth wrapped tightly with a polyethylene film was allowed to stand in a room kept at 20° C.

Above manner was repeated to obtain a padded cotton cloth, which was then wrapped tightly with a polyethylene film, and allowed to stand in a room kept at 5° C.

Both were allowed to stand for 20 hours, and thereafter washed with cool water and then hot water, soaped with a boiling detergent, washed with cool water and then dried.

There was observed almost no difference in their color shade and depth between the dyed products obtained after standing at 5° C. and 20° C. each for 20 hours. In this cold batch-up dyeing method, each monoazo compound was found to have excellent build-up property.

DYEING EXAMPLE 8

Using monoazo compounds obtained in Examples 20 to 32 each (25 parts) Dyeing Example 7 was repeated. Then results similar to those of Dyeing Example 7 were obtained.

DYEING EXAMPLE 9

The monoazo compounds obtained in Examples 1 to 19 each (25 parts) was dissolved in hot water, and the solution was cooled to 25° C. To this solution were added 32.5% aqueous sodium hydroxide solution (10 parts) and anhydrous sodium sulfate (30 parts), and then water was added thereto to make the whole 1000 parts at 25° C. Immediately thereafter, viscose rayon woven fabric was padded with the obtained padding liquor. The fabric padded was batched-up, wrapped tightly with a polyethylene film, and allowed to stand in a room kept at 20° C.

The above manner was repeated to obtain the fabric padded, which was then batched-up, wrapped with a polyethylene film and then allowed to stand in a room kept at 5° C.

Both were allowed to stand for 20 hours, and thereafter washed with cool water and then hot water, soaped with a boiling detergent, then washed with cool water and dried to obtain each dyed product.

There was observed almost no difference in color shade and depth between the dyed products obtained after standing at 5° C. and 20° C. each for 20 hours.

DYEING EXAMPLE 10

Using the monoazo compounds obtained in Examples 20 to 32, a manner similar to that of Dyeing Example 9 was carried out, then obtaining results similar to those in that Example.

DEYING EXAMPLE 11

Using the monoazo compounds obtained in Examples 1 to 19, Dyeing Example 3 was repeated, provided that sodium carbonate was used in an amount of 3 parts in place of 5 parts, thereby obtaining results similar to those in Dyeing Example 3.

DYEING EXAMPLE 12

Using the monoazo compounds obtained in Examples 1 to 19, Dyeing Example 3 was repeated, provided that the dyeing was continued at 50° C. in place of 60° C., thereby obtaining results similar to those in Dyeing Example 3.

DYEING EXAMPLE 13

Using the monoazo compounds obtained in Examples 1 to 19, Dyeing Example 3 was repeated, provided that sodium sulfate was used in an amount of 15 parts in place of 30 parts, thereby obtaining results similar to those in Dyeing Example 3.

DYEING EXAMPLE 14

Using the monoazo compounds obtained in Examples 20 to 32, Dyeing Example 4 was repeated, provided that water and sodium sulfate were used in each amount of 150 parts and 23 parts in place of 200 parts and 30 parts, respectively, thereby obtaining results similar to those in Dyeing Example 4.

DYEING EXAMPLE 15

Using the monoazo compounds obtained in Examples 33 to 67, Dyeing Example 1 was repeated, provided that sodium sulfate was used in an amount of 10 parts in place of 20 parts, sodium carbonate was added 20 minutes after the heating in place of 30 minutes thereafter, and the dyeing was continued at 60° C. in place of 50° C., thereby obtaining results similar to those in Dyeing Example 1.

What is claimed is:

1. A compound represented by the following formula in a free acid form,

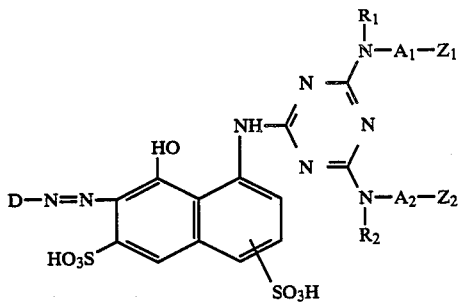

wherein $A_1$ and $A_2$ independently of one another are a phenylene group represented by the following formula,

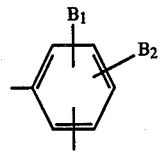

wherein $B_1$ and $B_2$ independently of one another are hydrogen, methyl, ethyl, methoxy, ethoxy, halogeno or sulfo, or a naphthylene group unsubstituted or substituted with one sulfo, $Z_1$ and $Z_2$ independently of one another are $-SO_2CH=CH_2$ or $-SO_2CH_2CH_2Y$ in which Y is a group capable of being split by the action of an alkali, $R_1$ and $R_2$ independently of one another are hydrogen or alkyl having 1 to 4 carbon atoms, which is unsubstituted or substituted with hydroxy, cyano, alkoxy, halogeno, carboxy, carbamoyl, alkoxycarbonyl, alkylcarbonyloxy, sulfo, or sulfamoyl, and D is a sulfophenyl of the formula

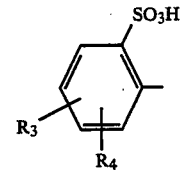

in which $R_3$ and $R_4$ independently of one another are hydrogen, methyl, ethyl, methoxy, ethoxy, chloro, bromo, acetylamino, propionylamino, nitro, sulfo or carboxy, or a sulfonaphthyl of the formula,

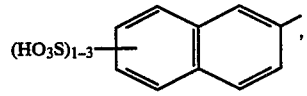

provided that $-A_1-Z_1$ and $-A_2-Z_2$ are different from each other when D is the sulfophenyl and both $R_1$ and $R_2$ are hydrogen.

2. A monoazo compound according to claim 1, wherein $R_1$ and $R_2$ independently of one another are hydrogen, methyl or ethyl.

3. A monoazo compound represented by the following formula in a free acid form,

[Chemical structure showing naphthalene-based monoazo compound with SO₃H, HO, NH, HO₃S, SO₃H substituents, triazine ring with NH linkages to two phenyl groups bearing Z₁ and Z₂ substituents]

wherein Z₁ and Z₂ independently of one another are —SO₂CH=CH₂ or —SO₂CH₂CH₂Y in which Y is a group capable of being split by the action of an alkali.

4. A monoazo compound according to claim 3, wherein both Z₁ and Z₂ are —SO₂CH₂CH₂OSO₃H.

5. A monoazo compound represented by the following formula in a free acid form,

[Chemical structure showing naphthalene-based monoazo compound with SO₃H, HO, NH, HO₃S, SO₃H substituents, triazine ring with N-R₅ and NH linkages to two phenyl groups bearing Z₁ and Z₂ substituents]

wherein Z₁ and Z₂ independently of one another are —SO₂CH=CH₂ or —SO₂CH₂CH₂Y in which Y is a group capable of being split the action of an alkali, and R₅ is alkyl having 1 to 4 carbon atoms.

6. A monoazo compound according to claim 5, wherein both Z₁ and Z₂ are —SO₂CH₂CH₂OSO₃H, and R₅ is methyl or ethyl.

7. A monoazo compound represented by the following formula in a free acid form,

[Chemical structure showing naphthalene-based monoazo compound with SO₃H, (SO₃H)₀₋₂, HO, NH, HO₃S, SO₃H substituents, triazine ring with N-R₁ and NH linkages to two phenyl groups bearing SO₂CH₂CH₂OSO₃H substituents]

wherein R₁ is hydrogen or alkyl having 1 to 4 carbon atoms, which is unsubstituted or substituted with hydroxy, cyano, alkoxy, halogeno, carboxy, carbamoyl, alkoxycarbonyl, alkylcarbonyloxy, sulfo, or sulfamoyl.

8. A monoazo compound according to claim 7, wherein R₁ is hydrogen, methyl or ethyl.

* * * * *